United States Patent [19]

Sasaki et al.

[11] Patent Number: 5,729,216

[45] Date of Patent: Mar. 17, 1998

[54] APPARATUS FOR MONITORING VEHICLE PERIPHERY

[75] Inventors: Kazuyuki Sasaki; Naoto Ishikawa; Kazutomo Fujinami, all of Susono, Japan

[73] Assignee: Yazaki Corporation, Tokyo, Japan

[21] Appl. No.: 847,989

[22] Filed: Apr. 22, 1997

Related U.S. Application Data

[63] Continuation of Ser. No. 402,179, Mar. 13, 1995, abandoned.

[30] Foreign Application Priority Data

Mar. 14, 1994 [JP] Japan ................... 6-042433

[51] Int. Cl.$^6$ ........................... G08G 1/017
[52] U.S. Cl. ................ 340/937; 340/903; 348/135; 348/142
[58] Field of Search ............ 348/148, 149, 348/135, 139, 140, 142, 143, 159, 42, 43, 116, 113, 169; 340/937, 901, 903, 435; 382/104, 284, 294

[56] References Cited

U.S. PATENT DOCUMENTS

| | | | |
|---|---|---|---|
| 4,449,144 | 5/1984 | Suzuki | 358/105 |
| 4,809,178 | 2/1989 | Ninomiya et al. | 364/443 |
| 5,139,327 | 8/1992 | Tanaka | 348/148 |
| 5,155,684 | 10/1992 | Burke et al. | 364/424.02 |
| 5,410,346 | 4/1995 | Saneyoshi et al. | 348/116 |
| 5,475,494 | 12/1995 | Nishida et al. | 356/401 |

FOREIGN PATENT DOCUMENTS

| | | |
|---|---|---|
| 4-261000 | 9/1992 | Japan . |
| 4-301512 | 10/1992 | Japan . |
| 4-301513 | 10/1992 | Japan . |
| 4301513 | 10/1992 | Japan . |

Primary Examiner—Thomas Mullen
Assistant Examiner—Julie B. Lieu
Attorney, Agent, or Firm—Armstrong, Westerman, Hattori, McLeland & Naughton

[57] ABSTRACT

A monitoring apparatus for monitoring the periphery of a motor vehicle in which patterns painted on the surface of a road are eliminated to shorten a time required for calculation to determine a position of a subject by processing image data generated by two cameras, whereby image data of the object having a height is derived by subtracting image data generated one camera from image data generating by the other camera after transferring either of image data to the other image coordinate by assuming that the transferring image data have a height of zero (0) for canceling road surface images and sounding an alarm whenever it is determined that the position of the object causes an obstacle of the moving vehicle.

13 Claims, 9 Drawing Sheets

BARREL-SHAPED DISTORTION

BOBBIN-SHAPED DISTORTION

RIGHT IMAGE

TRANSFER RIGHT IMAGE ONTO LEFT IMAGE

SUPERIMPOSE TRANSFERRED IMAGE ON LEFT IMAGE

LEFT IMAGE-TRANSFERRED IMAGE (DIFFERENCE IMAGE)

LEFT IMAGE

DIFFERENTIAL IMAGE

OBJECT EDGE IMAGE

TRANSFERRED IMAGE

LEFT IMAGE

TRANSFERRED IMAGE
−LEFT IMAGE

FIG. 12A

| -1<br>(Im-1, n-1) | 0<br>(Im-1, n) | 1<br>(Im-1, n+1) |
|---|---|---|
| -1<br>(Im, n-1) | 0<br>(Im, n) | 1<br>(Im, n+1) |
| -1<br>(Im+1, n-1) | 0<br>(Im+1, n) | 1<br>(Im+1, n+1) |

FIG. 12B

| -1<br>(Im, n-1) | 0<br>(Im, n) | 1<br>(Im, n+1) |
|---|---|---|

5,729,216

APPARATUS FOR MONITORING VEHICLE PERIPHERY

This application is a continuation of application Ser. No. 08/402,179 filed Mar. 13, 1995, now abandoned.

BACKGROUND OF THE INVENTION

1. Field of the Invention

The present invention relates to an apparatus for monitoring vehicle periphery to detect a danger by employing image signals generated by a pair of cameras which are mounted on a vehicle, and an alarm is sounded when it is determined that there exits a danger in the periphery of the vehicle.

2. Description of the Prior Art

As disclosed in Japanese Patent Application Laid Open No. Hei 4-261000 and Japanese Patent Application Laid Open No. Hei 4-301513, for example, there has been a method for calculating a position of an object by employing image signals generated by a pair of cameras.

In the prior art apparatus for monitoring vehicle periphery, an edge point $P_a$ of an object is detected by examining luminous differences between neighboring picture elements of an image signal generated by one of the cameras, a corresponding point $P_b$ of an image signal generated by the other camera that corresponds to the edge point $P_a$ is detected through a correlation method, and a position P of the object is calculated by using coordinate data of $P_a$ and $P_b$ on image signal coordinates.

As described above, in accordance with the conventional apparatus for monitoring the vehicle periphery, a luminous difference between neighboring picture elements of an image signal generated by one of the cameras has been compared for detecting an edge point of an object.

In accordance with the prior art apparatus, since objects having a height of zero, such as the white lines or characters painted on road surfaces, are also taken and included in image signals generated by taking cameras, and even these patterns painted on the road surfaces are also identified as object edge points. However, the patterns painted on road surfaces cannot be considered to be obstacles for moving vehicles.

Consequently, in accordance with the prior art apparatus, many unnecessary computations have been implemented to identifies patterns painted on road surfaces as objects and calculates their positions and such processing has required a extended period of time.

SUMMARY OF THE INVENTION

It is, therefore, an object of the present invention to provide an improved apparatus for monitoring the periphery of a vehicle wherein patterns painted on road surfaces are eliminated from processing data, and objects with height are extracted and for calculating their positions in a reduced processing time.

A monitoring apparatus in accordance with the present invention is capable of monitoring the periphery of a vehicle by using image data generated by a pair of right and left cameras being mounted on the vehicle at a predetermined interval, wherein provided are a pair of right and left memories for storing the image data derived from the pair of right and left cameras, road surface image eliminating means for eliminating images of patterns on the road surface by subtracting image data generated by right or left camera from transferred image data which is coordinate transferred from image data generated by left or right camera and transferred to the coordinate of the other camera on the assumption that all the images are recorded with zero height, edge detecting means for detecting edges of an object from an output of the road surface image eliminating means and a differential value in a horizontal direction of the non-transferred image data, object position calculating means for calculating positions of the object from the image data stored in the both memories through the edge of the object detected by the edge detection means, and alarm means for sounding an alarm in consonance with the positions calculated by the object position calculating means.

According to the present invention, an apparatus for monitoring the periphery of a vehicle further comprises distortion correction means for correcting the image data stored in both of the memories to compensate lens distortions for the pair of cameras.

In addition, in an apparatus of the present invention for monitoring the periphery of a vehicle, when detecting a difference between the transferred image data in the road surface image eliminating means and the image data stored in the other memory, the minimum value is selected from among those differences that exist between a plurality of neighboring picture elements and a picture element data of the other and defined as transferred difference data for that picture element.

As described above, in accordance with the present invention, an image taken by one camera is assumed to have a height of zero and transferred to an image coordinate of the other camera in order to treat the transferred image as image data taken by the other camera, whereby a difference image is generated through the subtraction between the transferred image and the image taken by the other camera, a differential image is derived from brightness difference in a horizontal direction of the image signal generated by the other camera, and edges of an object are detected by taking AND between the difference image and the differential image. Thus, as the points detected as the edges include no portions having the height of zero, and this results in the shortening of processing time by eliminating calculations for positions of unnecessary objects.

Further, since the distortion by lens aberration of the pair of cameras is compensated for the image signals, errors to be introduced by the distortion can be eliminated, no images having the height of zero are introduced in the difference image signal, and that no errors is introduced in the calculated position of the object.

For preparing a difference image by subtracting an image from a transferred image, when a difference between corresponding picture element data exceeds a specific threshold value, the minimum value that exists among the difference values between the data for a plurality of neighboring picture element and the picture element is assigned to the difference image data, therefore, the image portions having the height of zero can be eliminated completely from the transferred image even if an error is contained in the transferred image.

BRIEF DESCRIPTION OF THE DRAWINGS

FIGS. 12A and 12B are explanatory diagrams for preparing a differential image.

DETAILED DESCRIPTION OF THE PREFERRED EMBODIMENT

Figure 1:
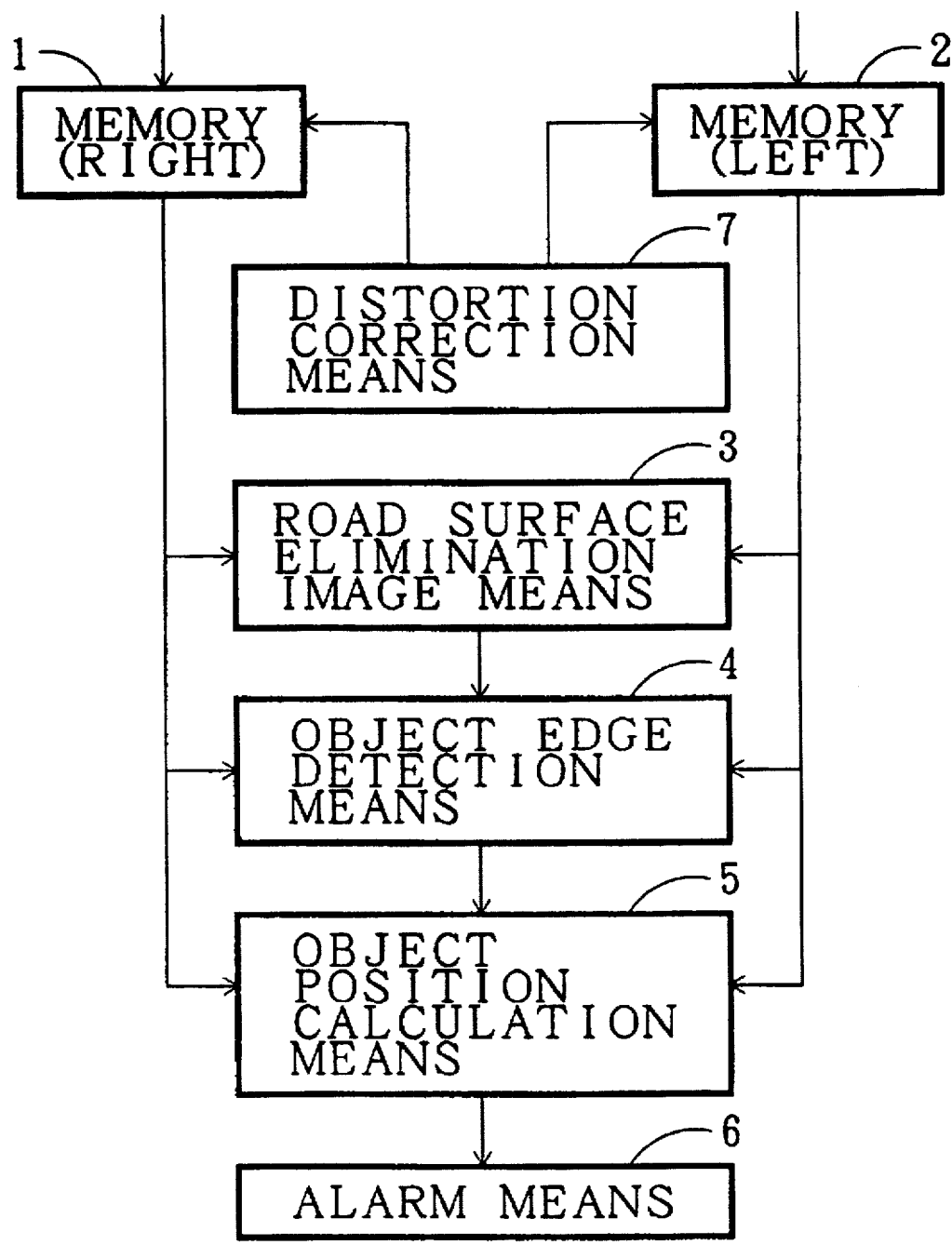
FIG. 1 is a diagram illustrating the fundamental arrangement according to the present invention.

Referring to FIG. 1, there is shown a block diagram for illustrating the fundamental arrangement according to the present invention.

Memories 1 and 2 are saved for storing image signals generated by a pair of cameras. A correction means 7 is provided for correcting distortions of image data stored in the memories 1 and 2, which distortions are caused by aberrations of the lenses of the cameras.

Road surface image elimination means 3 prepares transferred image data, wherein image data recorded on either of the memory 1 or 2 is transferred to the other image on the assumption that all the images recorded in the memory 1 or 2 have a height of zero and computes a difference between the prepared transferred image data and the image data of the other memory 2 or 1.

Edge detection means 4 detects edges of an object by employing a differential value in a horizontal direction of image data stored in the other memory and the image data outputted by the road surface image elimination means 3.

Object position calculation means 5 employs the image data recorded in the memory 1 and the memory 2 to calculate the position of the object by referring to the edges of an object detected by the object edge detection means 4.

Alarm means 6 sounds an alarm when it is determined that the object, the position of which is calculated by the object position calculation means 5, constitutes an obstacle to a moving vehicle.

Figure 2:
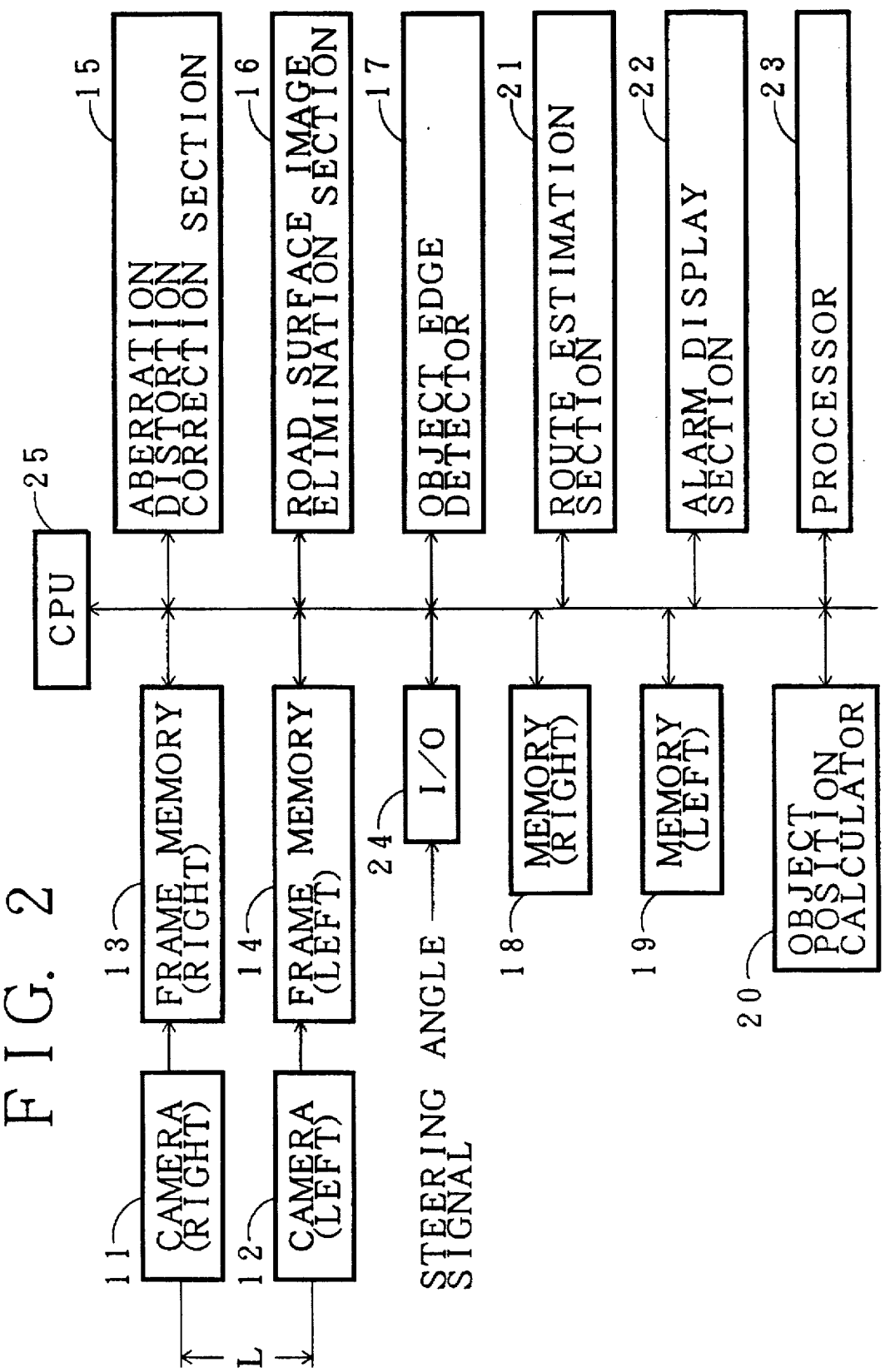
FIG. 2 is a diagram illustrating an arrangement of one embodiment according to the present invention.
Figure 3:
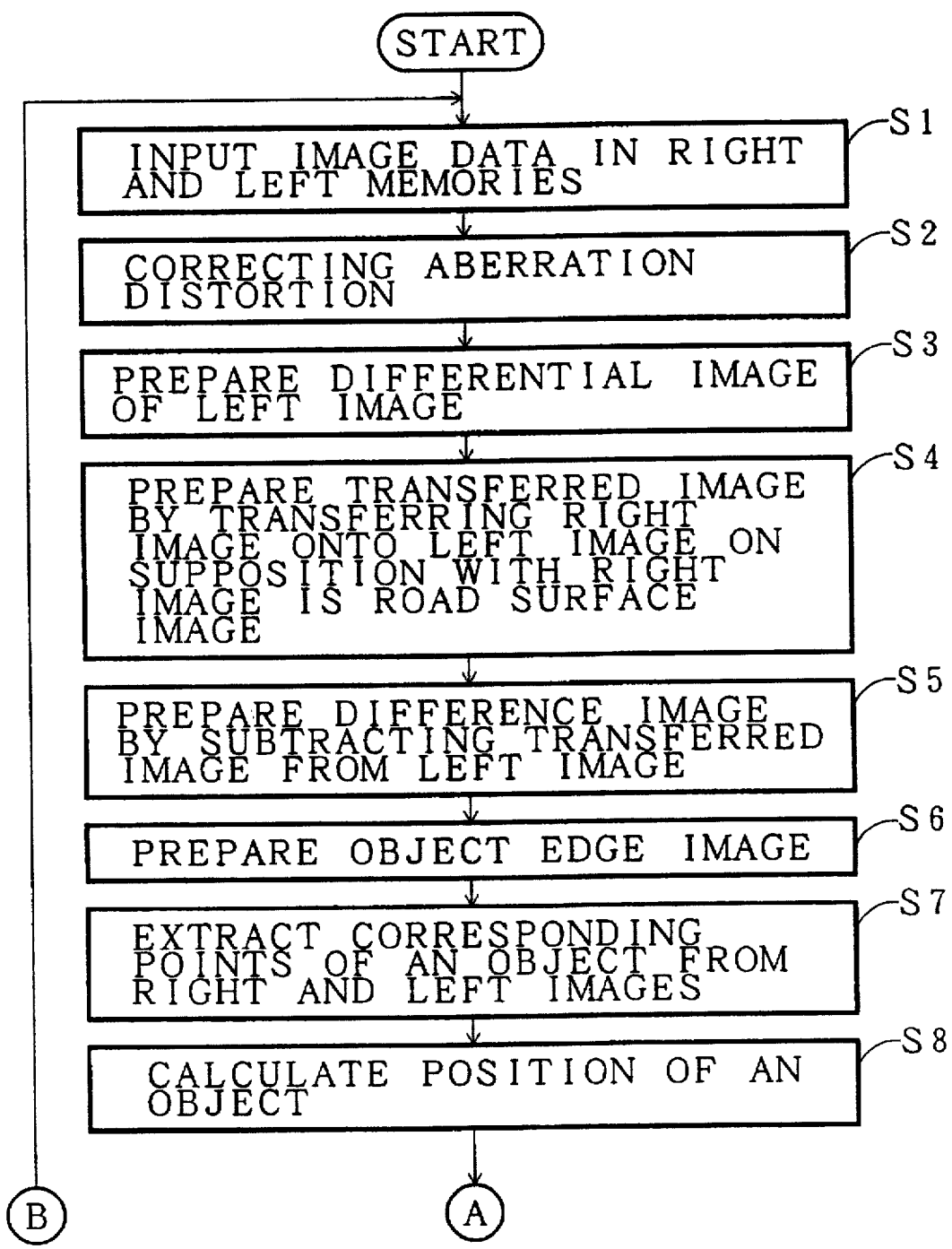
FIG. 3 is a flowchart showing the processing for the embodiment.
Figure 4:
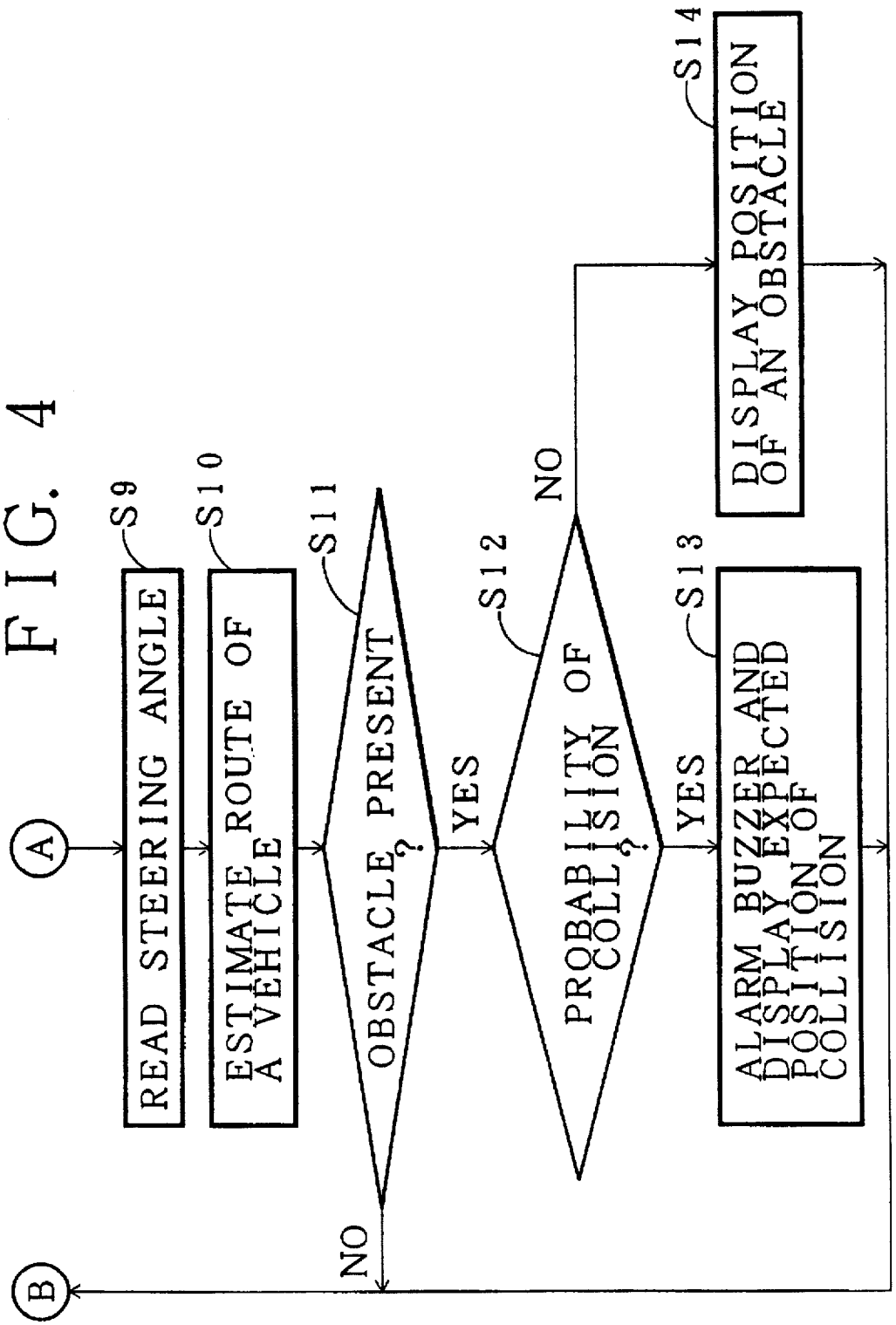
FIG. 4 is a flowchart showing the processing for the embodiment.

One embodiment of the present invention will now be explained by referring to FIGS. 2 through 4. FIG. 2 is a diagram showing the arrangement of the embodiment according to the present invention, while FIGS. 3 and 4 are flowcharts showing the signal processing of the embodiment.

In FIG. 2, cameras 11 and 12 generate image signals at the periphery of a vehicle. Frame memories 13 and 14 are employed to temporarily store image signals generated by the cameras 11 and 12.

A distortion correction section 15 corrects the signal distortions caused by the lens aberrations of the cameras 11 and 12 relative to the image data stored in the frame memories 13 and 14. A road surface image elimination section 16 eliminates road surface image data from image data stored in memories 18 and 19. An object edge detector section 17 detects edges of an object.

Further, an object position calculator section 20 computes a position of an object. Reference numeral 21 denotes a route estimation section, numeral 22 denotes an alarm display section, numeral 23 denotes a processor for performing other processes, numeral 24 denotes an interface (I/O) unit for reading a steering angle signal of a vehicle, and 25 denotes a central processing unit (CPU) for implementing all the signal processes.

The road surface image elimination means 3, the edge detection means 4, the object position calculation means 5, the alarm means 6, and the distortion correction means 7 correspond respectively to the road surface image elimination section 16, the object edge detector section 17, the object position calculator section 20, the alarm display section 22, and the distortion correction section 15.

First, the distortion correction section 15 will now be explained.

When the lenses of the cameras 11 and 12 have aberrations, image signals generated by the cameras 11 and 12 are distorted and cause errors in the processed resultants obtained by the road surface image elimination section 16, the object edge detector 17, and the object position calculator section 20, which will be described later.

Figure 5B:
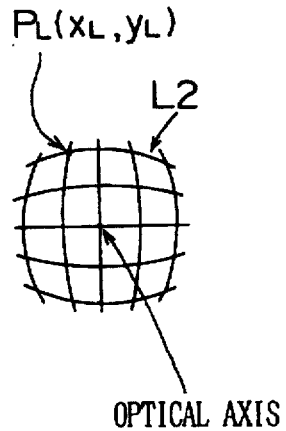
FIGS. 5A through 5D are diagrams for explaining the compensation of distortions caused by aberrations of lens of the embodiment.
Figure 5C:
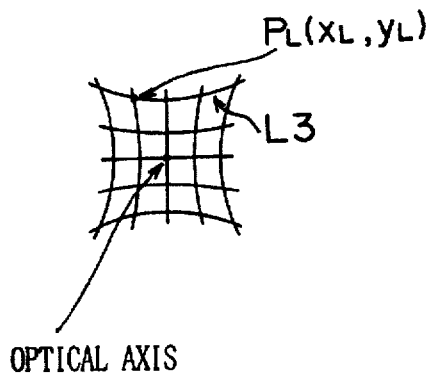
Figure 5A:
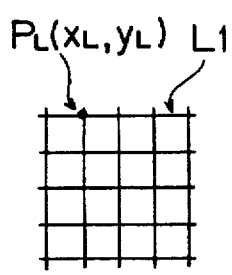

When there is no camera lens aberrations and a matrix pattern is pictured, as is shown in FIG. 5A, matrix image data are written into the frame memories. When there is some camera lens aberrations, however, as is shown in FIGS. 5B or 5C, distorted matrix image data are stored by the memories.

The amount of distortion becomes greater in proportion to the third power of a distance from the center of an optical axis to a point P.

Figure 5D:
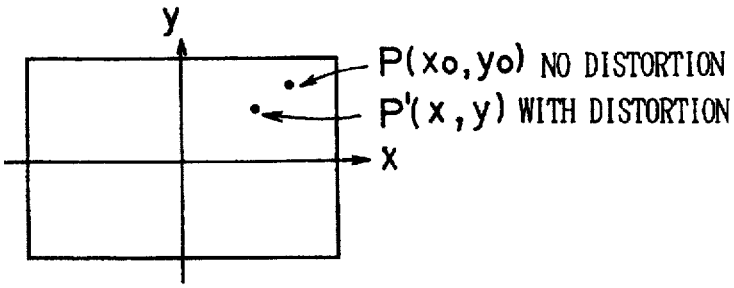

As is shown in FIG. 5D, assuming that point P $(x_0, y_0)$, when there is no aberration, is focused on a point P' $(x, y)$ by distortion, an amount of aberration value D is given by:

$$D = [(x_0-x)^2 + (y_0-y)^2]^{0.5} \quad (1).$$

D is proportionate to the third power of the distance from the center point of the lens to the point P. The value D is then given by:

$$[(x_0-x)^2 + (y_0-y)^2]^{0.5} = k[(x_0^2 + y_0^2)^{0.5}]^3 \quad (2)$$

wherein k is a proportional constant.

Therefore, when there is aberrations in the camera lens, it is corrected by the following calculations, for example:

$$x_0 \doteq x(1-k(x^2+y^2))$$

$$y_0 \doteq y(1-k(x^2+y^2)) \quad (3)$$

The distortion correction section 15 calculates equations (3) for picture element data which are stored in the frame memories 13 and 14 for correcting the lens aberration in consonance with the results, and then writes the resultant data into the memories 18 and 19.

In this case, there is an absence of data in each of the memories 18 and 19 after the correction process is performed. For picture elements for which there are no data, interpolation is performed based on the data for adjacent picture elements.

Figure 6:
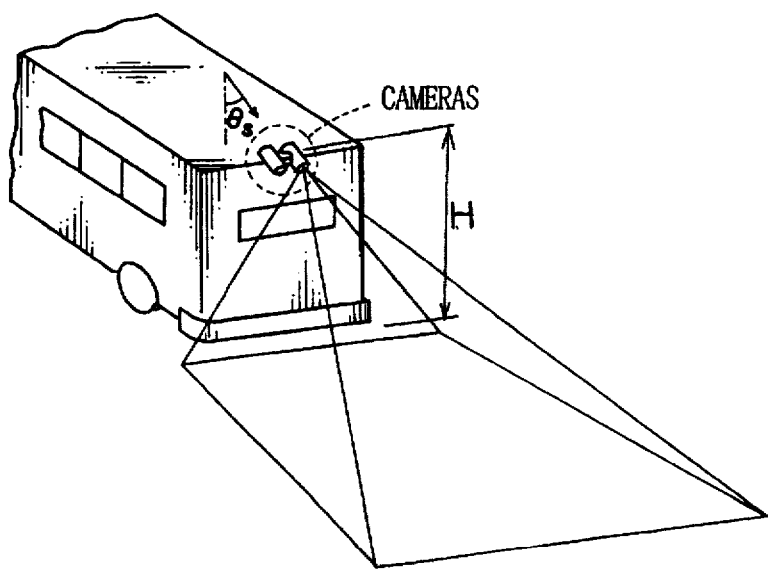
FIG. 6 is an explanatory diagram for the side of a vehicle on which cameras are mounted.

As is shown in FIG. 6, the cameras 11 and 12 are mounted on the rear portion of a vehicle at a height of H above the road surface and taking pictures of the rear periphery of a vehicle.

Figure 7:
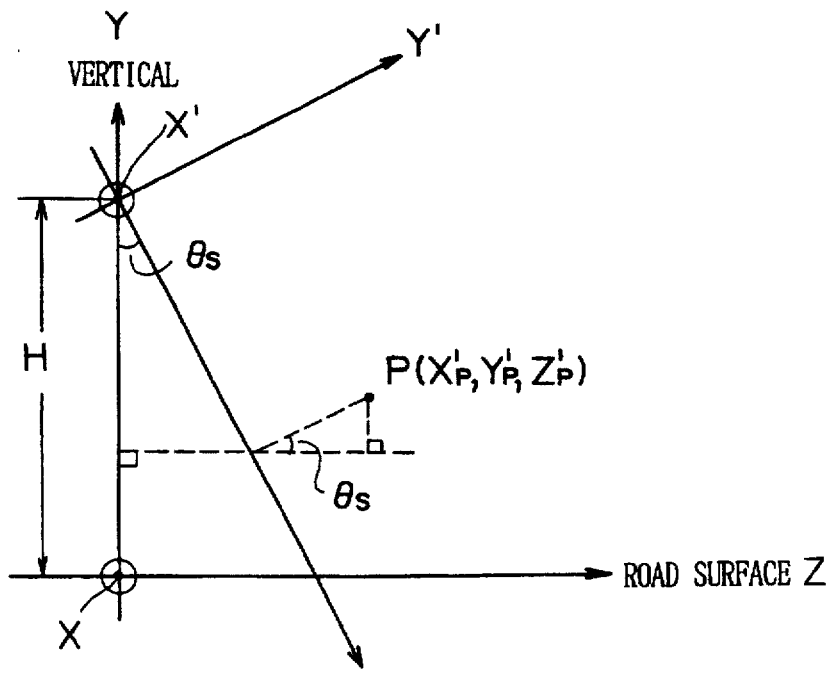
FIG. 7 is a graph for correcting depression angles of cameras in the embodiment.

To make easier the following explanation, as is shown in FIG. 7, the coordinates at a mounting point of cameras are designated by X', Y' and Z', and the coordinates at the road surface are represented by X, Y, and Z respectively. When an angle of depression of the mounted camera is θ=90, the coordinates at the road surface is given by:

$$X=X', \quad Y=Y'+H, \quad Z=Z' \qquad (4)$$

Figure 8:
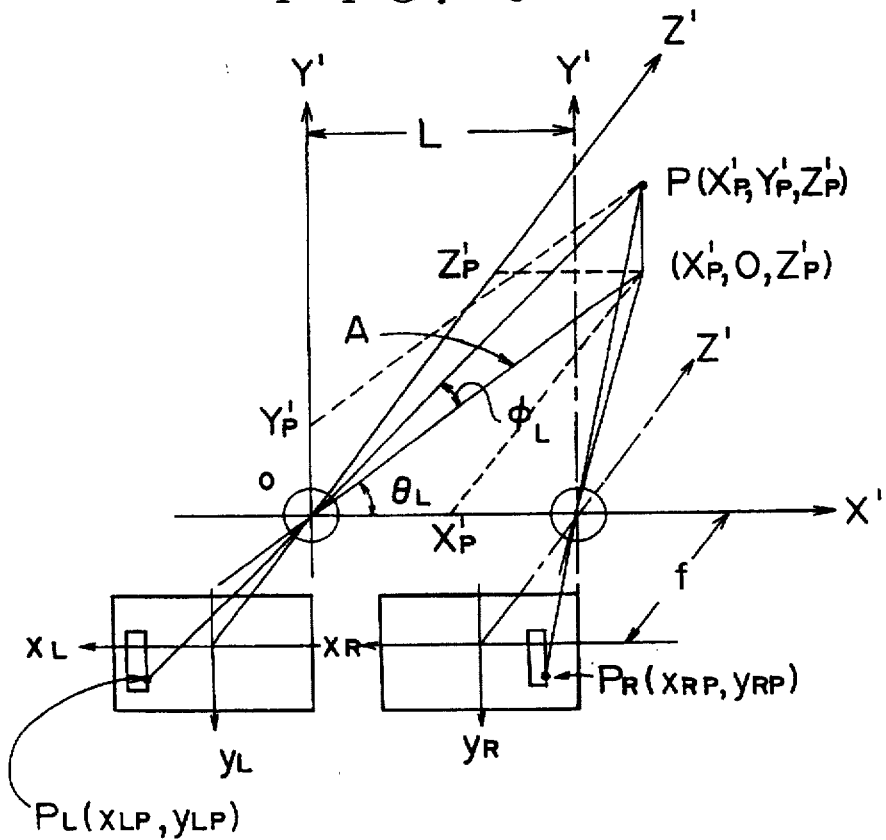
FIG. 8 is a graph for measurement of a three-dimensional position in the embodiment.

As shown in FIG. 8, the optical axes of the lenses of the cameras 11 and 12 are adjusted along the Z' axis and the cameras 11 and 12 are positioned at an interval of L.

First, the calculation of the position of an object, which is performed by the object position calculator 20, will be described.

Referring again to FIG. 8, the X' axis is defined to correspond to a line connects the centers of the pair of cameras 11 and 12, which cameras are then arranged so that the X' axis is in parallel with the road surface.

The Y' axis is perpendicular to the Z' axis and the X' axis, and is also perpendicular to the road surface.

For making the explanation easier, the origin 0 of the X', Y', and Z' axes is assigned to the center of the lens of the left camera 12.

When stored data for point P ($X_P'$, $Y_P'$, $Z_P'$), which is generated by the mounted cameras 11 and 12 and written into the memories 18 and 19 are denoted by $P_L L(x_{LP}, y_{LP})$ and $P_R(x_{RP}, y_{RP})$, the distance $Z_P'$ to the point P will be given by:

$$Z_P' = Lf/(x_{LP} - x_{RP}) \qquad (5)$$

wherein L is a distance between the center points of the both lenses, and f is a focal distance for the lenses.

Therefore, the object position calculator 20 reads $x_{LP}$ from the memory 19, and $x_{RP}$ from the memory 18 and calculates $Z_P'$.

By referring to FIG. 8, $Y_P'$ at point P($X_P'$, $Y_P'$, $Z_P'$) is given by:

$$\begin{aligned} Y_P' &= A \tan\Phi_L \\ &= Z_P' \tan\Phi_L/\sin\theta_L \\ &= Z_P' y_{LP}/f \qquad (6) \\ &= L y_{LP}/(x_{LP} - x_{RP}) \qquad (7) \end{aligned}$$

Further, by referring to FIG. 8, $X_P'$ at point P($X_P'$, $Y_P'$, $Z_P'$) is given by:

$$\begin{aligned} X_P' &= A \cos\theta_L \\ &= Z_P' \cos\theta_L/\sin\theta_L \\ &= Z_P' x_{LP}/f \qquad (8) \\ &= L x_{LP}/(x_{LP} - x_{RP}) \qquad (9) \end{aligned}$$

When a distant of an object along the X axis from the center points of the cameras 11 and 12 is required, X axis distance $X_P'$ can be attained by calculating the following equation:

$$X_P' = X_P' - L/2 \qquad (10)$$

Then, as is shown in FIG. 6, the cameras are directed downward with an angle $\theta_s$ from the vertical direction, correction is required.

The graph in FIG. 7 shows that the angle of depression of the cameras is $\theta_s$.

The coordinates ($X_P'$, $Y_P'$, $Z_P'$), represented by X' Y' Z' coordinates, for the position of point P can be given by the road surface X Y Z coordinates as shown in FIG. 7.

Assuming that the values for point P are $X_P$, $y_P$, and $Z_P$ in X Y Z coordinates, which are derived from $Z_P'$, $Y_P'$, and $X_P'$ after implementing the calculations in accordance with the equations (5), (7), and (9), the values $X_P$, $Y_P$, and $Z_P$ will be given by:

$$X_P = X_P' \qquad (11)$$

$$Y_P = H - Z_P' \cos\theta_s + Y_P' \sin\theta_s \qquad (12)$$

$$Z_P = Z_P' \sin\theta_s + Y_P' \cos\theta_s \qquad (13)$$

The object position calculator 20 calculates the position of an object by equations (11) through (13).

Next, the road surface image elimination section 16 will be explained.

When white lines, characters, etc., are painted on the surface of a road, these are recognized as objects to detect and distances from a motor vehicle to these objects are also calculated.

However, the white lines, characters and the like which are painted on the surface of roads do not constitute obstacles for a moving motor vehicle. Accordingly, if images of such objects having no height are eliminated from the calculation in advance, the calculation for determining a position of an object to detect can be simplified.

The principle for eliminating unwanted images of paintings on a road surface will be described by referring to FIG. 9.

Figure 9A:
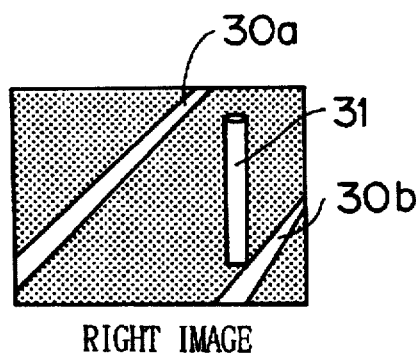
FIGS. 9A through 9D are explanatory diagrams for road surface image elimination in the embodiment.

FIG. 9A is a diagram showing right images pictured by the camera 11 and stored in the memory 18. In FIG. 9A, reference numerals 30a and 30b denote white lines painted on the surface of a road, and numeral 31 denotes an object such as a pole.

Figure 9B:
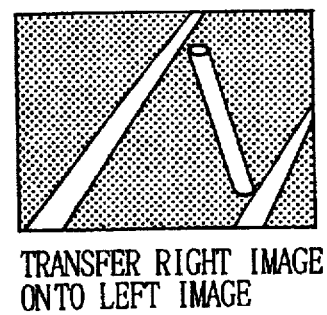

It is assumed that the right images stored in the memory 18 have a height of zero or they are images of paintings on the road surface, and the right image is processed by calculation to obtain a transferred image coordinate of the other camera in order to treat the transferred right image as image data being taken by the left camera 12 (FIG. 9B).

Figure 9C:
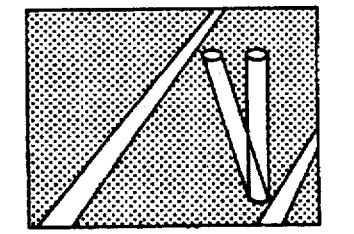

The transferred right images are superimposed on the left images stored in the memory 19, and the resultant images are given by FIG. 9C.

In other words, when the images that are obtained by the right camera 11 are transferred, a pattern, such as of white lines painted on the road surface, overlaps a pattern of images, in position and brightness, generated by the left camera 12. However, when an object is such that it has some heights from the road surface, there is a greater difference between the transferred right image and the left image in proportional to a height from the road surface.

Figure 9D:

Therefore, as shown in FIG. 9D, by computing a difference between the transferred right image data and left image data, the luminance values of picture elements, which constitute the road surface, other than those picture elements of an object having some height become zero or substantially zero in brightness. Accordingly, by assigning the brightness at or below predetermined threshold value to zero value, or all the image data of the objects painted on the road surface becomes zero. Therefore, the image data having the brightness other than zero remain as the object having a height from the road surface and all the image data of the objects having no height are eliminated from the calculation for determining a position of the object.

The calculation of a transferred image for treating all the right images to have zero height will now be explained.

It is assumed that a point in a transferred image that corresponds to point $P_R(x_{RP}, y_{RP})$ of the right image is $P_L'(x_{LP}', y_{LP}')$.

As shown in FIG. 7, when the X' axis for the camera coordinates and the X axis for the road surface coordinates are parallel, and the x axis (the $x_L$ axis and the $x_R$ axis in FIG. 8) of sweep lines of an image generated by the cameras are also in parallel, therefore values of $y_L$ and $y_R$ of images of the same object generated by the both cameras coincide with each other.

Therefore, $$y_{LP}' = y_{RP} \quad (14)$$

As to $x_{LP}'$, when all the images are on the road surface, $Y_P'$ given by equation (12) will be:

$$0 = H_P - Z_P' \cos\theta_s + Y_P' \sin\theta_s \quad (15)$$

by substituting $Z_P'$ of equation (5) for $Z_P'$ of equation (15) above and that $Y_P'$ of equation (7) for $Y_P'$ if equation (15) above, the $x_{LP}'$ is given by the following equation:

$$X_{LP}' = (L_f \cos\theta_s - L y_{RP} \sin\theta_s)/H + x_{RP} \quad (16)$$

At the road surface image elimination section 16, equations (14) and (16) are calculated to obtain a transferred image (FIG. 9B).

When the transferred image is prepared, a difference relative to the left image stored in the memory 19, is calculated and then road surface images are eliminated (FIG. 9D).

There are some cases such that by an error introduced into the prepared transferred image, complete elimination of the image data of the objects painted on the road surface can not be implemented after deriving a difference between the transferred right image and the left image as shown in FIG. 9D.

Figure 11A:
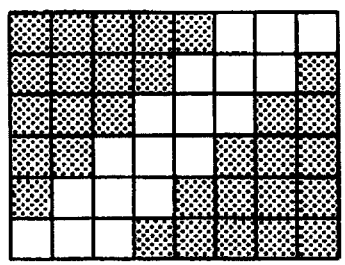
FIGS. 11A through 11F are explanatory diagrams for preparing a difference image.
Figure 11B:
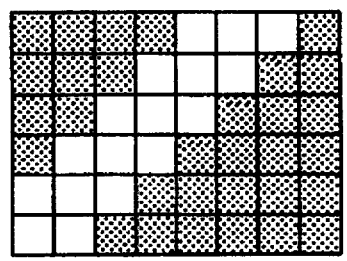
Figure 11C:
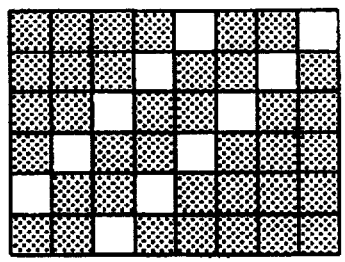

FIG. 11A shows picture elements of the transferred right image and FIG. 11B shows picture elements of the left image of the white line painted on the road surface of the road being stored in the memory 19, and FIG. 11C shows the resultant image after the left image has been subtracted from the transferred right image.

In FIG. 11C, dark picture elements denote no brightness difference between the two images, while the white picture elements denote the existence of brightness difference between the two images.

If an error is included in the transferred image, it does not completely coincide with the left image, and some portions of the pattern painted on the road are not eliminated as shown by the white picture elements in FIG. 11C.

To obtain, therefore, an effective difference between the transferred right image and the left image, the following process is performed.

Figure 11D:
Figure 11E:
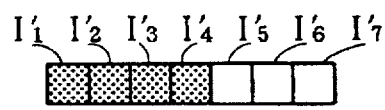
Figure 11F:
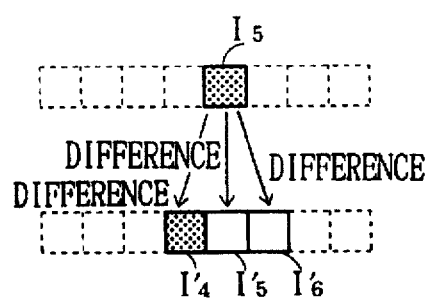

As shown in FIGS. 11D and 11E, the difference between each brightness $I_1-I_7$ of the picture elements of the transferred image and each brightness $I_1'-I_7'$ of the picture elements of the left image is produced successively in order. At the time when a difference for a picture elements exceeds a specific value $I_0$ (which corresponds to $I_5$ in FIG. 11F), differences between the neighboring picture elements are produced, and the minimum difference value is defined as a differential value for that pixel.

An image obtained by a difference between the transferred image and the left image is called a difference image and that a value of a picture element (m, n) of the difference image is defined by $D_{m,n}$, the difference image is given by:

If $|U_{m,n} - I_{m,n}'| < I_0$, $D_{m,n} = 0$.
If $|U_{m,n} - I_{m,n}'| \geq I_0$, $|U_{m,n} - I_{m,n-1}'| \geq I_0$ 
and (17)

if $|U_{m,n} - I_{m,n+1}'| \geq I_0$, $D_{m,n} = 1$
in other cases, $D_{m,n} = 0$ In the examples shown in equations (17), $D_{m,n}$ is obtained from the differences between $I_{m,n}$ and its adjacent $I_{m,n-1}'$ and $I_{m,n+1}'$. However, $D_{m,n}$ may be obtained from the differences for the sequentially adjacent $I_{m,n-k}'$ through $I_{m,n+k}'$.

Since data value $D_{m,n}$ of the difference image is obtained in this manner, even if one difference is:

$$|I_5 - I_5'| = 1$$

the other difference will be:

$$|I_5 - I_4'| = 0,$$

so that the image of a pattern painted on the road surface can be completely eliminated.

Figure 10A:
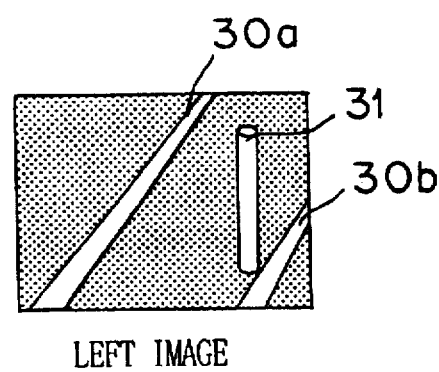
FIGS. 10A through 10C are explanatory diagrams for object edge detection in the embodiment.

The object edge detector 17 will now be explained. The white lines 30a and 30b painted on the road surface and the object such as a pole 31 on the road, which are similar to those as explained in FIG. 9A, are pictured by the left camera 12, and the image data generated and stored in the memory 19 are shown in FIG. 10A.

Brightness value $I_{m,n}$ of image data for rows m and columns n stored in the memory 19, is scanned in a horizontal direction, and a difference image is obtained by the followings:

If $|U_{m,n+1} - I_{m,n}| \geq E_0$, $E_{m,n} = 1$, and (18)
if $|U_{m,n+1} - I_{m,n}| < E_0$, $E_{m,n} = 0$ wherein $E_0$ is a threshold value.

To obtain a differential image in accordance with the above processing, the edge portions of images in a vertical direction of an object and characters painted on the road surface have a value of "1," and the other portions have a value of "0."

Figure 10B:
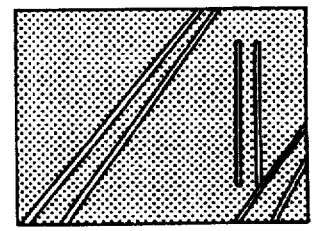
Figure 10C:
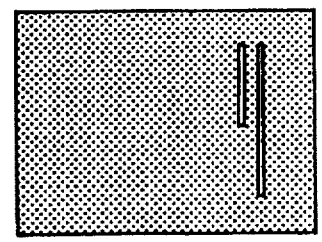

The thus obtained differential image (FIG. 10B) is superimposed on the difference image (FIG. 9D) which is obtained by the road surface image elimination section 16 to produce an AND of the images, so that only the edge portions of the object shown in FIG. 10C are extracted.

Therefore, since by computing only a three-dimensional position for the extracted edges of the object, the computation process can be considerably reduced.

A spatial filter may be used in a method for preparing the differential image (FIG. 10B).

FIG. 12A shows a 3×3 spatial filter, while FIG. 12B shows a 1×3 spatial filter. To obtain a picture element value $E_{m,n}$ for a picture element (m, n) of the differential image, the center of the filter is brought to coincide with the picture element (m, n) of the memory 19, and the brightness I of each picture element is multiplied by a coefficient shown by parentheses ( ).

In case of the 3×3 spatial filter shown in FIG. 12A, the individual picture element value $E_{m,n}$ of the differential image is given by:

if $|(I_{m-1,n+1} + I_{m,n+1} + I_{m+1,n+1}) -$ $(I_{m-1,n-1} + I_{m,n-1} + I_{m+1,n-1})| \geq$ $E_0'$, $E_{m,n} = 1$, and $< E_0'$, $E_{m,n} < 0$ wherein $E_0'$ is a threshold value (19)

When the 1×3 spatial filter of FIG. 12B is employed, $E_{m,n}$ is given by:

if $|I_{m,n+1} - I_{m,n-1}| \geq E_0"$, $E_{m,n} = 1$, and (20)
if $|I_{m,n+1} - I_{m,n-1}| < E_0"$, $E_{m,n} = 0$ The processing of the preferred embodiment of the present invention will now be explained while referring to FIGS. 3 and 4.

At step S1, the processor 23 stores image data generated by the cameras 11 and 12 in the respective memories 13 and 14.

At step 2, the distortion correction section 15 corrects data stored in the frame memories 13 and 14 in consonance with the lens aberrations for the cameras 11 and 12, and stores the resultant data in the respective memories 18 and 19.

At step S3, the object edge detector 17 scans left image data that are recorded in the memory 19 in a horizontal direction, and prepares a differential left image (FIG. 10B) by implementing computations in accordance equations (18), (19), or (20), and stores the differential image in a memory (not shown).

At step S4, by assuming that the right image stored in the memory 18 is a road surface image, a transferred image (FIG. 9B) is prepared by transferring the right image to the left image at the road surface image elimination section 16, and stores the transferred image data in a memory (not shown).

At step S5, the road surface elimination section 16 subtracts the transferred image data, which is prepared at step S4, from the left image data, which is stored in the memory 18, and prepares a difference image (FIG. 9D), and then stores the difference image data in a memory (not shown).

At step S6, the object edge detector 17 employs the differential image (FIG. 10B), which is prepared at step S3, and the difference image (FIG. 9D), which is prepared at step S5, to obtain an object edge image (FIG. 10C) that represents the edges of an object, and stores it in a memory (not shown).

At step S7, the processor 23 extracts, from the memories 18 and 19, corresponding points in the right and left images of an object to be measured with respect to the edge portions of the object edge image data, which are prepared at step S6.

At step S8, the object position calculator 20 calculates positions that correspond to the points that are extracted at step S7.

At step S9, the route estimation section 21 reads a steering angle signal via the I/O interface 24.

At step S10, the route estimation section 21 employs the steering angle read at step S9 to calculate an estimated route for the motor vehicle.

At step S11, the alarm display 22 determines from the result calculated at step S8 whether or not an obstacle exists.

When the decision is No, program control returns to step S1. When the decision is YES, program goes to step S12.

At step S12, a decision is made by the alarm display unit whether or not the motor vehicle may collide with the detected obstacle by comparing the position of the obstacle with the estimated route calculated at step S10, whereas the decision is YES, program goes to step S13 where an alarm is sounded by a buzzer (not shown) and a position where a collision may take place is displayed. When there is no possibility of collision, program goes to step S14 to display the position of an obstacle, and then returns to step S1.

In the above described embodiment, the transferred image is prepared by using a right image and the resultant image is superimposed on a left image. Instead of this, however, a transferred image may be formed by using a left image and the resultant image may be superimposed on a right image.

Further, in the embodiment as described above, a process has been performed for all the image data generated by the cameras.

However, as the processing may be performed only for a limited number of horizontal scanning lines, such as selected 20 scanning lines, of image data if it is possible to detect an object having a size that could be an obstacle for a motor vehicle, and the obstacle detection is implemented within this selected region for reducing considerably a time required for the computations.

As described above, according to the present invention, the following effects can be obtained.

The transferred image data are obtained by assuming that all the images generated by one camera have a height of zero in order to treat the transferred image data as it is taken by the other camera for the elimination of unnecessary images of objects which are painted on the road surface.

A difference between the transferred image of one camera and the image generated by the other camera is produced to prepare a difference image, while a differential image is also produced by employing the brightness difference in a horizontal direction of an image signal generated by the other camera, and the edges of an object are detected by taking AND between the difference image and the differential image. Thus, the points detected as the edges have no data which has a height of zero, and no position calculation is implemented for unnecessary objects, this results in the shortening of the processing time.

Further, since the aberrations of the lens of the cameras are corrected for generated image signals, any distortion errors caused by the lens aberrations can be eliminated, so that a difference image does not include a portion having a height of zero, and there will be no errors in the calculated position of an object.

When preparing a difference image by subtracting an image from a transferred image, if a difference between corresponding picture elements of the both images exceeds a specific threshold value, the minimum value that exists among the differences between a plurality of neighboring picture elements and one specific picture element is defined as difference image data. Even if there is an error in a transferred image, the complete removal from the transferred image of a portion having a height of zero is ensured.

Although one preferred embodiment of the present invention has been described, the present invention is not thereby limited to this embodiment and can be varied or modified within the scope and the spirit of the invention.

What is claimed is:

1. A monitoring apparatus for monitoring the periphery of a vehicle, comprising:

first camera means which outputs first image data representing a view at a first position, and second camera means which outputs second image data to representing a view at a second position, said first camera means and said second camera means being mounted on the vehicle at said first and second positions, respectively, and spaced apart a predetermined distance;

a first memory and a second memory for respectively storing said first image data and said second image data;

road surface image elimination means, for preparing transformed first image data by transforming said first image data stored in said first memory to transformed first image data representing a view at said second position of images of said first image data with the assumption that all the images of said first image data are of no height, and for eliminating road surface images by computing a difference between said transformed first image data and said second image data, producing difference image data;

differentiation means for deriving differential image data differentiated in a horizontal direction from said second image data;

object edge detection means for detecting edge of an object by executing an AND operation of said difference image data and said differential image data;

object position calculation means for calculating a position of said object from said first and second image data stored in said first and second memories and said edges detected by said object edge detection means; and alarm means for creating an alarm depending on the position calculated by said object position detection means.

2. A monitoring apparatus according to claim 1, further comprising distortion correction means for correcting image data stored in both of said first and second memories in consonance with the aberrations of the lenses of said first camera means and said second camera means.

3. A monitoring apparatus according to claim 1 wherein, upon computing a difference between said transformed first image data and said second image data, when a difference between corresponding picture element data of said transformed first image data and said second image data exceeds a specific value, a minimum difference value among differences that exist between one of said picture element data and a plurality of picture element data neighboring thereto is selected to be the difference between said two image data for that picture element data.

4. A monitoring apparatus according to claim 2 wherein, upon computing a difference between said transformed first image data and said second image data, when a difference between corresponding picture element data of said transformed first image data and said second image data exceeds a specific value, a minimum difference value among differences that exist between one of said picture element data and a plurality of picture element data neighboring thereto is selected to be the difference between said two image data for that picture element data.

5. A monitoring apparatus according to claim 1, 2, 3 or 4, wherein said differential image data differentiated in a horizontal direction is derived by utilizing a spatial filter.

6. A monitoring apparatus according to any one of claims 1 to 3 or 4, wherein said object position calculation is executed within a selected region.

7. A monitoring apparatus according to claim 1, wherein said object edge detection is implemented by executing AND operation after said difference image data and said differential image data are converted respectively to binary difference image data and binary differential image data at respective threshold levels.

8. A monitoring apparatus for monitoring the periphery of a vehicle, comprising:

first camera means which outputs first image data representing a view at a first position, and second camera means which outputs second image data representing a view at a second position, said first camera means and said second camera means being mounted on the vehicle at said first and second positions, respectively, and spaced apart a predetermined distance;

a first memory and a second memory for respectively storing said first image data and said second image data;

road surface image elimination means, for preparing transformed first image data by transforming said first image data stored in said first memory to transformed first image data representing a view at said second position of images of said first image data with the assumption that all the images of said first image data are of no height, and for eliminating road surface images by computing a difference between said transformed first image data and said second image data, producing difference image data;

object determination means for determining the presence of an object from said difference image data; and alarm means for creating an alarm depending on the determination of said object position determination means.

9. A method for monitoring the periphery of a vehicle, comprising:

obtaining first image data representing a view at a first position, and obtaining second image data representing a view at a second position, said first and second positions being spaced apart a predetermined distance;

preparing transformed first image data by transforming said first image data to transformed first image data representing a view at said second position of images of said first image data with the assumption that all the images of said first image data are of no height;

eliminating road surface images by computing a difference between said transformed first image data and said second image data, producing difference image data;

deriving differential image data from said second image data;

detecting edges of an object by executing an AND operation of said difference image data and said differential image data;

calculating a position of said object from said first and second image data and said edges detected in said detecting step; and creating an alarm in response to the position calculated in said calculating step.

10. The method of claim 9, wherein said first and second image data is obtained using first and second cameras, respectively, mounted on said vehicle at said first and second positions, respectively.

11. The method of claim 10, further comprising:

correcting said first and second image data as a function of aberrations, of said first and second cameras.

12. The method of claim 9 wherein;

said eliminating road surface step includes selecting, when a difference between corresponding picture element data of said transformed first image data and said second image data exceeds a specific value, a minimum difference value among differences that exist between one of said picture element data and a plurality of picture element data neighboring thereto, as the difference between said two image data for that picture element data.

13. A method for monitoring the periphery of a vehicle, comprising:

obtaining first image data representing a view at a first position, and second image data representing a view at a second position, said first and second positions being spaced apart a predetermined distance;

preparing transformed first image data by transforming said first image data to transformed first image data representing a view at said second position of images of said first image data with the assmuption that all the images of said first image data are of no height;

eliminating road surface images by computing a difference between said transformed first image data and said second image data, producing difference image data;

determining the presence of an object from said difference image data; and creating an alarm in response to the determination of said object in said determining step.

* * * * *